United States Patent [19]
Wallin et al.

[11] 3,826,921
[45] July 30, 1974

[54] MONITOR FOR RADIATION-INDUCED HEATING

[75] Inventors: Walter R. Wallin, Idaho Falls, Idaho; Virgil W. Lowery, Gaithersburg, Md.; Richard R. Smith, Idaho Falls, Idaho

[73] Assignee: The United States of America as represented by the United States Atomic Energy Commission, Washington, D.C.

[22] Filed: Apr. 26, 1973

[21] Appl. No.: 354,723

[52] U.S. Cl.............. 250/390, 73/355 R, 250/352, 250/472
[51] Int. Cl............................................. G01t 1/12
[58] Field of Search ........... 250/526, 252, 439, 443, 250/472, 473, 352, 390; 73/355 R

[56] References Cited
UNITED STATES PATENTS
3,033,985  5/1962  Petree.................................. 250/352
3,660,659  5/1972  Eisenman............................ 250/352

OTHER PUBLICATIONS
A Reactor In–Core Temp. Monitor by Franklin et al., Trans. of American Nuclear Society 14 (2) 632 October 1971.

Primary Examiner—Harold A. Dixon
Attorney, Agent, or Firm—John A. Horan; Arthur A. Churn; Hugh W. Glenn

[57] ABSTRACT

A susceptive material that is to be examined with respect to radiation-induced heating is sealed within a capsule composed of a material such as stainless steel. The remaining capsule volume is filled with a liquid metal that has a greater coefficient of thermal expansion than the capsule walls. The liquid expansion permanently deforms the capsule in an amount representative of its maximum temperature. The capsule is co-axially supported within an outer container, thus forming a gas-filled annulus having a known resistance to heat transfer. The heat generated by irradiation of the susceptive material is determined by the temperature difference required for its transfer across the annulus.

9 Claims, 2 Drawing Figures

MONITOR FOR RADIATION-INDUCED HEATING

CONTRACTURAL ORIGIN OF THE INVENTION

The invention described herein was made in the course of, or under, a contract with the UNITED STATES ATOMIC ENERGY COMMISSION.

BACKGROUND OF THE INVENTION

This invention relates generally to the monitoring of temperature and radiation-induced heating rates in normally uninstrumented locations. The monitor described herein has particular application to the measurement of radiation-induced heating within nuclear reactors, radioisotope heat sources and other facilities that include high internal radiation levels. In fast neutron reactors that are in test and demonstration stages it is most important to identify and locate structural and component materials which are especially susceptible to radiation-induced heating in order to provide adequate cooling. Gamma-induced heating, in particular, may produce high temperatures at specific locations that could weaken or partially melt reactor components.

In certain radioactive heat sources that employ gamma emitters such as cobalt-60, heat is produced in varying amounts from the central to the outer core region by gamma irradiation of susceptive material. A profile of the gamma-induced heating can be obtained through use of the monitor described herein.

Both reactors and radioisotope heat sources operate at high temperatures and require complete containment of the radioactive materials within their cores. Conventional temperature monitors often include electrical or tubing leads that penetrate the containment shell to reveal internal temperatures. Not only must the leads be protected from the elevated temperatures but the points of penetration must be completely sealed to ensure against loss of radioisotopes and heat. These problems make the use of such leads most difficult in radioactive power or production facilities.

A temperature monitor has been developed that records the maximum temperature obtained by the plastic deformation of a liquid-metal-filled capsule. The monitor is described in Transactions of the American Nuclear Society 14 (2), 632 (October 1971), "A Reactor In-Core Temperature Monitor," D. G. Franklin and W. E. Ruther, Argonne National Laboratory. However, this prior monitor is limited to the measurement of temperature and does not provide for the measurement of heat production or loss rates within susceptive materials at specific locations.

SUMMARY OF THE INVENTION

In view of the limitations of the prior art, it is therefore an object of the present invention to provide a monitor for determining the radiation-induced heating rate at specific locations within the core of a radioactive facility.

It is a further object to provide such a monitor that can be employed without electrical leads or tubing connections to the outside of the facilities.

It is also an object to provide such a monitor that will record the heating rate at the maximum power output of a radioactive facility.

In accordance with the present invention, a sealed capsule composed of a permanently deformable material is filled with a thermally expandable liquid and a material which is susceptive to radiation. The capsule is held within an outer container to form an annular chamber having a known resistance to heat transfer. A temperature sensor is located to measure the maximum temperature at the outside surfaces of the outer container.

When the monitor of the present invention is disposed within a radiation field, the radiation absorbed by the susceptive material heats the expandable liquid to produce a plastic deformation of the capsule. The amount of the deformation is representative of the maximum temperature which occurred in the capsule. The maximum temperature reached at the outer container wall is detected by the temperature sensor and the temperature difference across the annulus of known heat transfer resistance is thereby determined. From these data, the heat transferred across the annulus and therefore the rate of heat production within the susceptive material at maximum temperatures is obtained.

DESCRIPTION OF THE DRAWINGS

The present invention is illustrated in the accompanying drawings wherein.

DETAILED DESCRIPTION OF THE INVENTION

Figure 1:
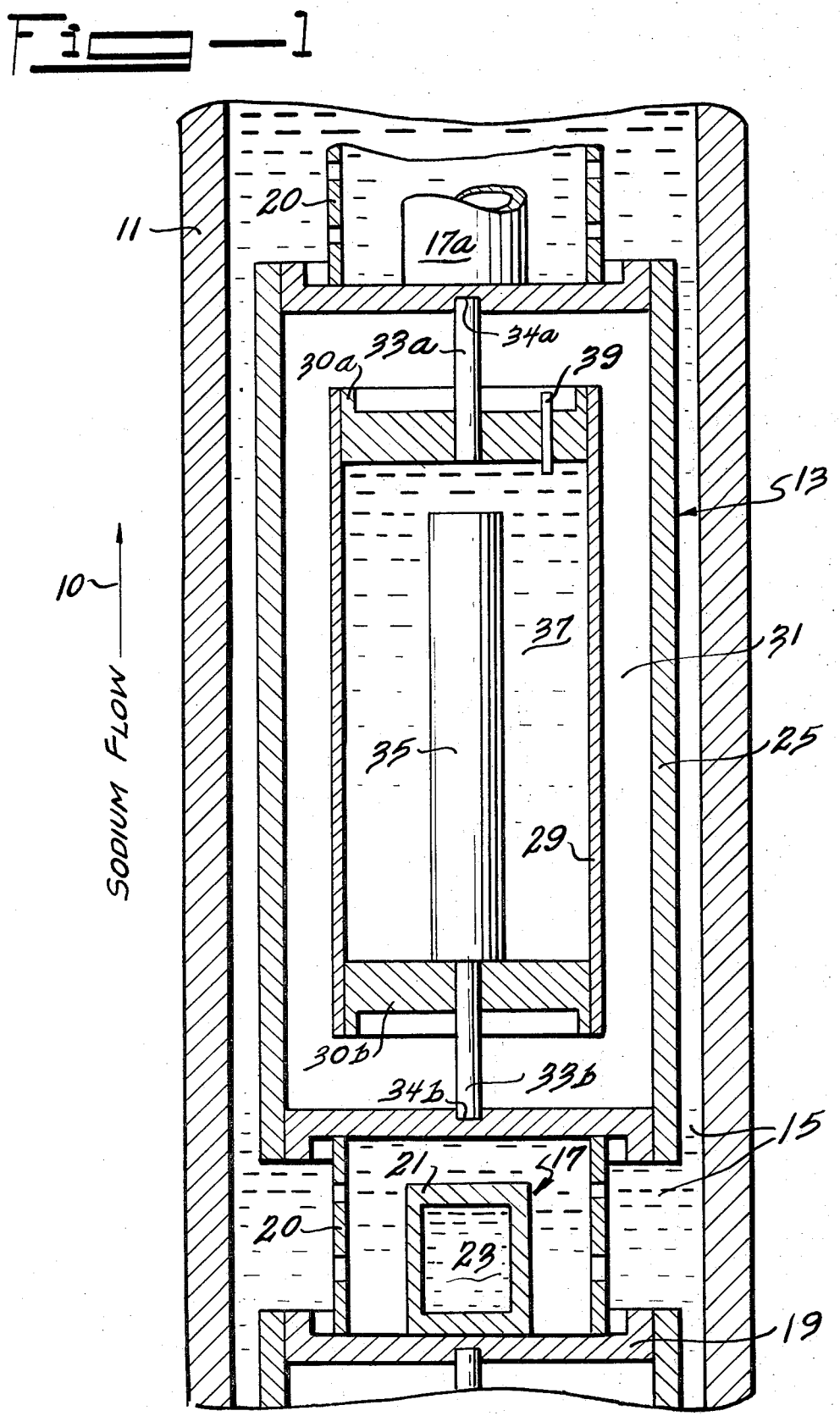
FIG. 1 is an elevation view partially in cross section of a heating rate monitor disposed within a core tube of a radioactive facility.

Turning now to FIG. 1 where there is shown a core tube 11 within a nuclear reactor or other radioactive facility. The outside surface of the tube 11 is exposed to the reactor coolant 10 such as a flow of liquid sodium metal as is often used in fast breeder reactors. A heating rate monitor generally designated at 13 is shown coaxially placed within tube 11. Heat conduction between the monitor 13 and tube 11 is provided by a liquid-metal bond 15 in the generally annular space between the tube and monitor. Through use of a liquid metal such as sodium or a sodium-potassium alloy that has a high coefficient of thermal conductivity, the temperature along the monitor and at the tube wall can be maintained at about the same level for accurate heating rate determinations.

A temperature sensor 17 is supported on a structural member 19 at the lower portion of the heating rate monitor. It will be clear that member 19 may be coupled to or actually be the top portion of another heating rate monitor depending on the spacing desired between monitors. A perforated spacer or linkage 20 surrounding the sensor connects member 19 to monitor 13 while allowing natural convection of the liquid-metal bond 15 through its perforations into contact with the temperature sensor 17.

The temperature sensor 17 includes a sealed, cylindrical vessel 21, composed of a deformable material such as a chromium-steel alloy, completely filled with a liquid metal 23 such as sodium. As the temperature increases, liquid metal 23 expands to permanently deform the chromium-steel vessel 21. Sufficient void space (not shown) is provided towards the top of tube 11 to accommodate displacement and expansion of liquid-metal bond 15. Subsequent measurement of the deformed volume of vessel 21 along with knowledge of its original volume allows determination of the maximum temperature that occurred within the liquid-metal bond 15.

A second temperature sensor 17a can be mounted at the top of monitor 13 to compare its reading with that of sensor 17. In some applications it may be desirable to use an alternating sequence of heating rate monitors with temperature sensors to determine heat production rates along a line through a facility. Also other type temperature sensors such as thermocouples can be used outside tube 11 in contact with the reactor coolant, either in addition to or in place of sensor 17.

Shown above the temperature sensor 17 is a closed, cylindrical container 25 that is supported from its two end closures within core tube 11 by linkages 20. As mentioned, linkages 20 can interconnect heating rate monitor 13 to other similar monitors in a longitudinal array. The array can be suitably supported within core tube 11 by rods or other structural members (not shown) from the top or the bottom of the radioactive facility.

A cylindrical capsule 29 having sealed end closures 30a and 30b is coaxially held within outer container 25 by axial pins 33a and 33b which connect the opposing end closures of the container and capsule. These pins should be snugly fitted but not welded into indentations 34a and 34b within the end closures of container 25 to prevent volume and mass changes that would result from cutting the pins loose when the monitor is disassembled. An annular chamber 31 formed between the outer and inner walls of capsule 29 and container 25 is filled with a known density of inert gas such as helium or nitrogen. The gas provides a known resistance to heat transfer between capsule 29 and the liquid metal bond 15 at the outside surfaces of container 25. Axial pins 33a and 33b are of elongated shape with large length to diameter ratios to minimize heat conduction lengthwise across annular chamber 31.

Capsule 29 is shown with end closures 30a and 30b of increased thickness in respect to the walls of its cylindrical body to facilitate a welded fabrication. Axial pins 33a and 33b are thus sealingly attached into central openings within end closures 30a and 30b and these end closures are sealingly welded onto the capsule body. A cylindrical or otherwise shaped susceptive material 35 is shown fixedly located within the central portion of capsule 29. The remainder of the capsule volume is filled with a liquid metal 37. To permit filling after the capsule has been assembled, a tubular needle 39 is sealingly passed through an opening penetrating end closure 30a. After filling, needle 39 is welded closed to seal the capsule.

Capsule 29 is constructed of a deformable material such as a chromium-steel alloy that can undergo a permanent and measurable deformation without rupture. Liquid metal 37 is selected to have a greater coefficient of thermal expansion than that of the deformable material used for the walls of capsule 29. This combination of materials will permit the permanent deformation of the capsule walls to record the maximum expansion and thus the maximum temperature of the liquid metal. One suitable combination includes liquid-sodium metal as metal 37 and A.I.S.I. alloy No. 304 stainless steel as the construction material for capsule 29.

Often it will be desirable to use a chromium-steel alloy, that is a stainless steel, as the susceptive material 35. This is due to the frequent use of stainless steels, either A.I.S.I. alloy Nos. 304, 316 or other chromium-steel alloys, as construction materials in fast breeder and other nuclear reactors. In these instances, the heating rate determinations are facilitated if capsule 29 is fabricated of the same material as the susceptive material. In other instances, where the radiation-induced heating rates within reactor-control and reflector materials are being investigated, it may be desirable to construct capsule 29 of a different material from that of susceptive material 35. For example, a boron carbide neutron-absorbing material or a beryllium neutron-reflecting material could be examined as the susceptive material, while a chromium-steel alloy is used for the construction of capsule 29. In this latter case, where the two materials are not identical, it is preferable to provide a substantially larger mass of susceptive material 35 than the mass of the deformable material used in the walls of capsule 29. This will cause most of the radiation-induced heat to be deposited within the susceptive material at the center of the capsule.

In employing the monitor described above, the volumes of capsule 29 and vessel 21 are carefully measured at a reference temperature after being filled with liquid metal but prior to assembly within the reactor core tube 11. The expanded volumes are again measured after a test run to determine the volume increase in each member. Of course, the weight of water equivalent to the volume increase can be readily determined by weighing the member in water before and after expansion. Duplicates of both the capsule 29 and the vessel 21 are previously calibrated at about 50°C. intervals by heating a control capsule and vessel over the expected range of temperature exposure. The effective temperature range of the monitor can be shifted either upwardly or downwardly merely by adjusting the temperature at which the capsule is filled.

Figure 2:
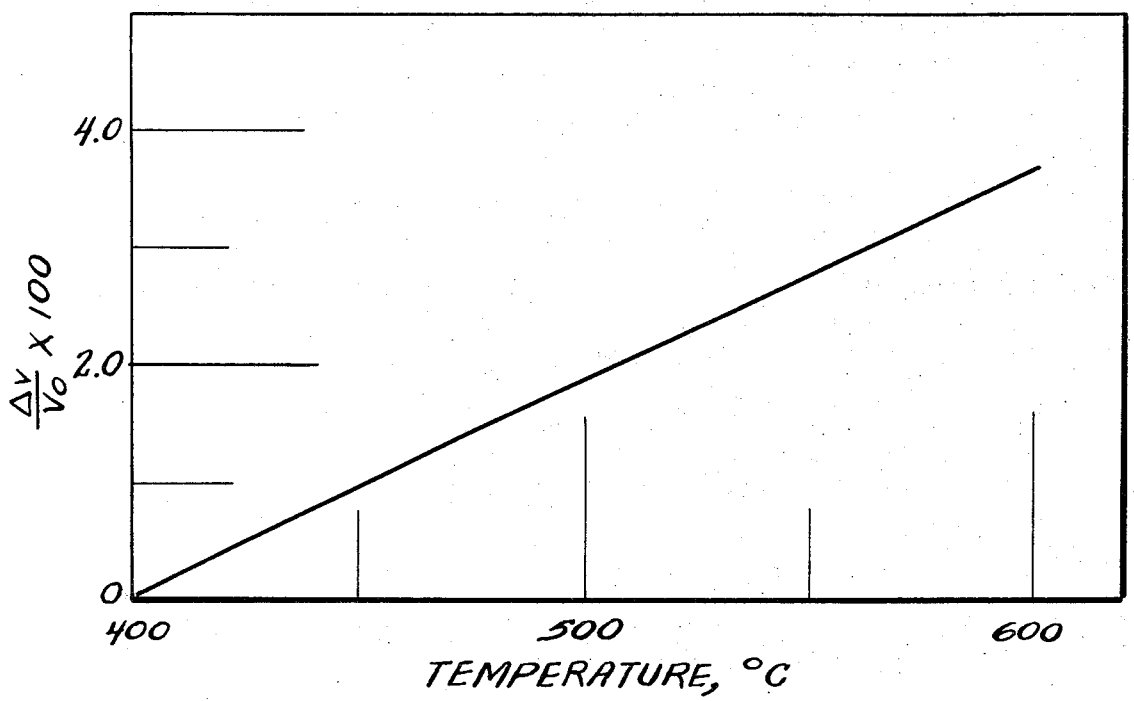
FIG. 2 is a typical calibration curve relating temperature to expansion that is employed with the monitor of FIG. 1.

A typical calibration curve will generally show a linear relationship between the change in volume ($\Delta V$) divided by the original volume ($V_o$) plotted against the temperature. One such curve for a 304 stainless steel vessel filled with liquid sodium and having an original volume of about 6 cubic centimeters is illustrated in FIG. 2. In this system it is preferred that the temperature corresponding to $V_o$ be about 100° to 200°C. below the highest temperature expected within the capsule to produce a conveniently measurable deformation without rupture. Of course, the reference temperature at which $V_o$ is measured will be high enough to appear on the calibration curve.

Monitor 13 is assembled within reactor tube 11 during a shutdown for refueling or other alterations of the reactor core. After the reactor operation is resumed, gamma radiation absorbed within the susceptive material 35 and the deformable material of capsule 29 is converted to heat. Liquid sodium is a good choice for the expandable liquid 37 as it will be heated a relatively small amount as a result of gamma irradiation. Also, by providing the susceptive material with a substantially larger mass than the capsule walls, most of the gamma radiation is absorbed and converted to heat in the susceptive material. This heat is transferred by conduction to the liquid-sodium metal which expands in response to its temperature increase. The walls of capsule 29 are also heated but do not thermally expand as much as the liquid sodium. Consequently, the capsule walls are stressed beyond their yield strength to produce a permanent or plastic deformation. The maximum temperature occurring in the liquid metal 37 and the capsule 29 is sufficient to transfer the heat deposited by radiation within the susceptive material across the gas-filled annulus 31 and into the liquid-metal bond 15. From that point the heat is readily conducted into the reactor coolant 10, which is at a temperature just below the temperature of the liquid-metal bond. The maximum temperature in the liquid-metal bond will be represented by the permanent deformation of vessel 21 within temperature sensor 17.

After removing the heating rate monitor from the reactor, the expanded volumes of capsule 29 and vessel 21 are measured by a water displacement procedure. From the volume increases of these members, the maximum temperatures within the capsule 29 and the liquid-metal bond 15 are found from appropriate calibration curves.

The heating rate per unit mass of susceptive material can then be determined from the following formula:

$$G = Q/M = (UA/M)(Tc - Ts)$$

where $G$ is the gamma or other radiation-induced heating rate per unit mass $M$ is the mass of the susceptive material and the capsule $Q$ is the rate of heat deposited by radiation of mass $M$ $UA$ is the overall heat transfer coefficient including average area for heat transfer between capsule 29 and the liquid-metal bond 15

$Tc$ is the maximum temperature of the capsule 29

$Ts$ is the maximum temperature registered by the temperature sensor 17 contacting liquid-metal bond 15.

It will be clear that the term $UA$ could also be termed the heat transfer conductance or the reciprocal of the resistance to heat transfer, that is for the most part contributed by the gas-filled annulus 31. This heat transfer resistance or conductance is readily obtained by empirical methods with known rates of heat input into capsule 29. For instance, the susceptive material can be replaced with a metered electric heater and the heat transfer coefficients determined over a range of heat input rates for a particular monitor design.

The present invention permits the determination of radiation-induced heating rates at specific locations and in specific susceptive materials within a nuclear reactor or other radioactive facility. Reactor structural materials, control element materials or reflector materials may typically be examined to determine the rate that heat will be deposited in them and, consequently, the amount of cooling required to prevent damage. The measurements can be made without the requirement of electrical leads or fluid tubes for relaying temperature signals from within the reactor core where extreme conditions are present. The maximum temperatures and heating rates obtained at the selected specific locations will be permanently recorded within the expanded volumes of liquid-metal-filled capsules for later detection.

The embodiments of the invention in which an exclusive property or privilege is claimed are defined as follows:

1. A device for measuring radiation-induced heating at a location within a radiation field comprising:
   A. a sealed capsule having walls composed of a deformable material;
   B. a mass of susceptive material partially filling the volume of said capsule;
   C. thermally expandable liquid filling the remainder of said capsule volume for outwardly deforming the capsule walls at elevated temperatures;
   D. an outer container defining an annular chamber around said capsule, said chamber including means for providing a known heat transfer resistance between said capsule and container walls; and
   E. sensor means comprising a vessel of deformable material filled with thermally expandable liquid for measuring the temperature outside said outer container whereby, in conjunction with the deformation of said capsule walls, the heat production within said susceptive material is determined.

2. The device of claim 1 wherein said thermally expandable liquid in said capsule has a greater coefficient of thermal expansion than said deformable material.

3. The device of claim 1 wherein said deformable material of said capsule is a chromium-steel alloy and said thermally expandable liquid is sodium.

4. The device of claim 1 wherein said susceptive material and said deformable material of said capsule are of essentially the same composition.

5. The device of claim 1 wherein said means for providing a known heat transfer resistance comprises a known density of inert gas occupying said annular chamber.

6. The device of claim 1 wherein said capsule is coaxially supported within said outer container.

7. The device of claim 1 wherein there is included a liquid-metal bond between the outside surfaces of said outer container and said sensor means.

8. The device of claim 1 wherein means are provided for supporting said device within a core tube of a nuclear reactor and a liquid-metal bond is disposed in communication with said tube, said sensor means and said outer container.

9. The device of claim 1 wherein said susceptive material and deformable material of said capsule are composed of different substances and the mass of said susceptive material being substantially greater than the mass of said deformable material in said capsule walls.

* * * * *